Oct. 8, 1957     A. D. CELAPINO     2,808,822
STONE CUTTING MACHINE
Filed Jan. 11, 1956                4 Sheets-Sheet 3
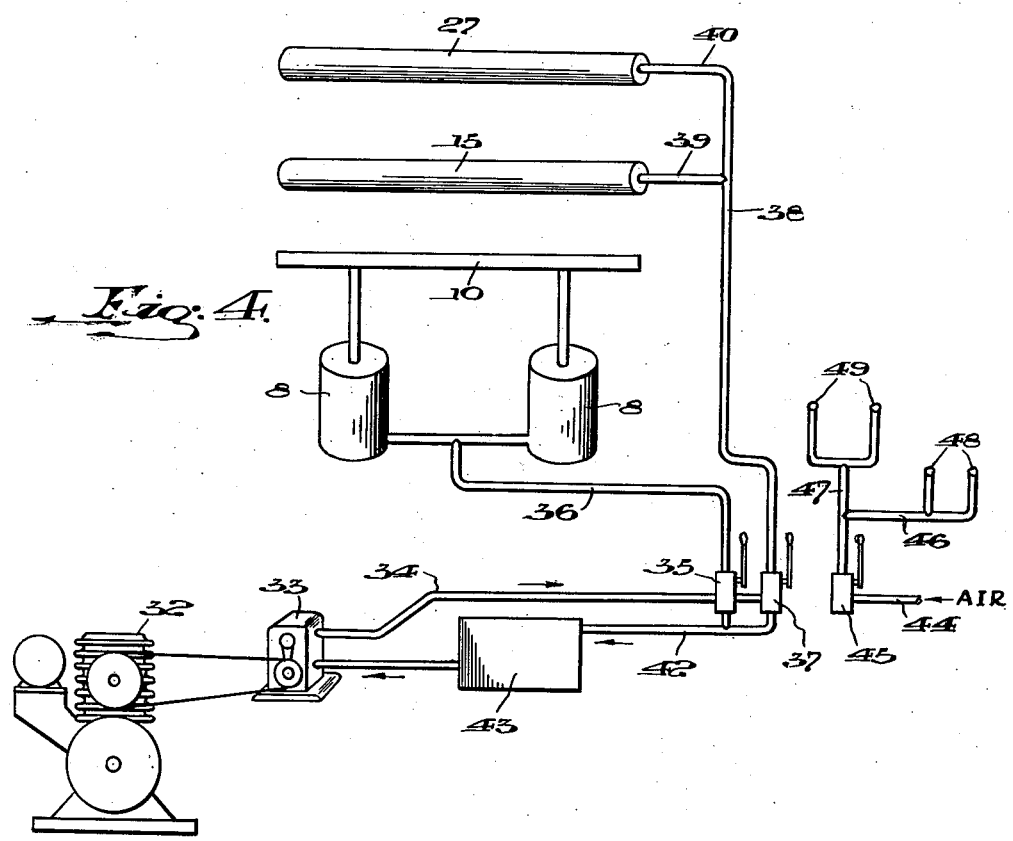
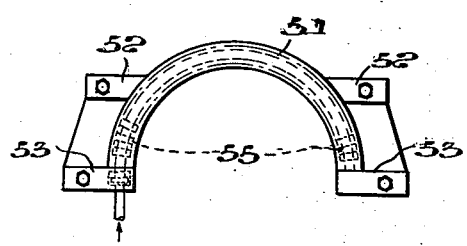
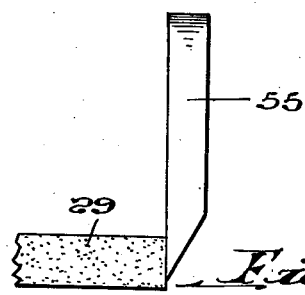
INVENTOR.
ABE D. CELAPINO.
BY Archworth Martin
his ATTORNEY Oct. 8, 1957 A. D. CELAPINO 2,808,822
STONE CUTTING MACHINE
Filed Jan. 11, 1956 4 Sheets-Sheet 4
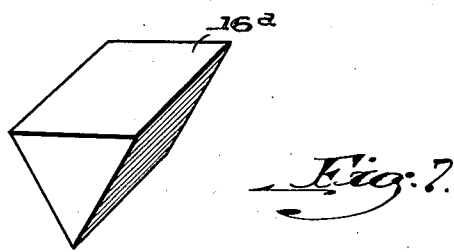
Fig. 7.
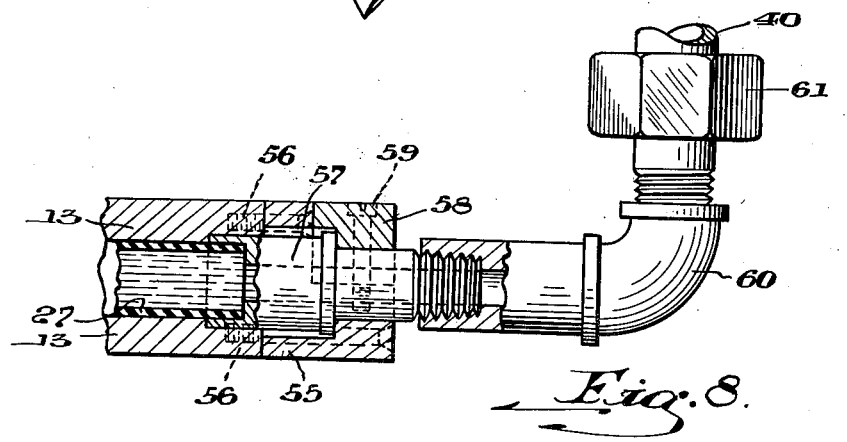
Fig. 8.
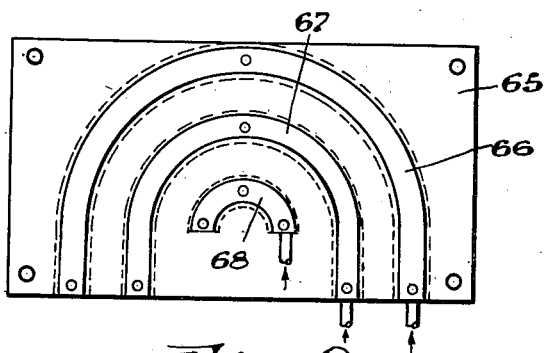
Fig. 10. Fig. 9.
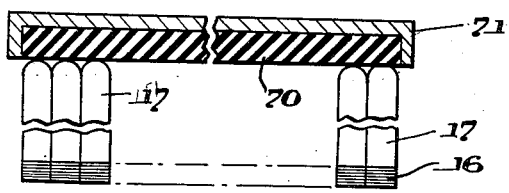
INVENTOR.
ABE D. CELAPINO.
BY Ashworth Martin
his ATTORNEY.

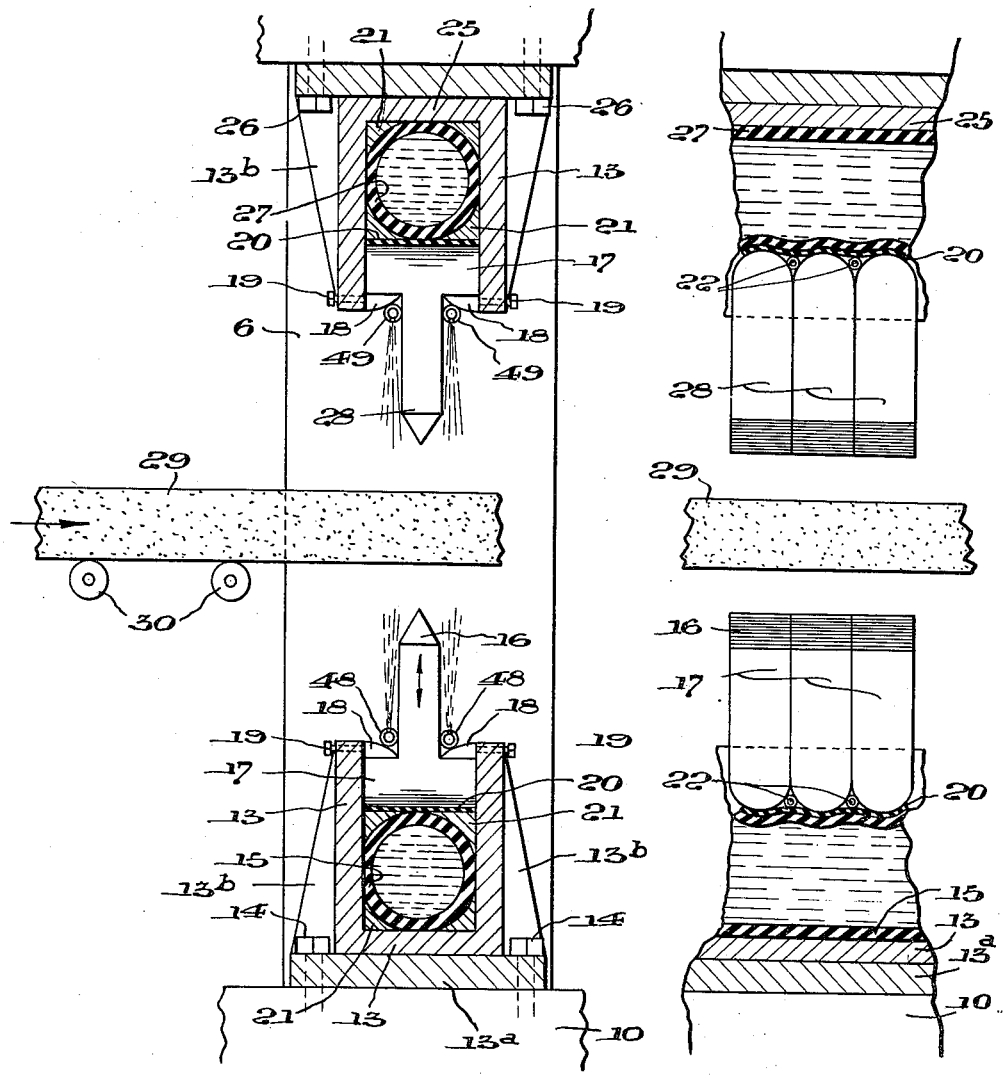

United States Patent Office 2,808,822
Patented Oct. 8, 1957

2,808,822

STONE CUTTING MACHINE

Abe D. Celapino, Belle Vernon, Pa.; Rini R. Celapino and Edith Ruffini, executrices of said Abe D. Celapino, deceased Application January 11, 1956, Serial No. 558,528

9 Claims. (Cl. 125—23)

My invention relates to stone-cutting or shearing machines of the type wherein knives of chisel-like form are impressed against the faces of stone slabs or blocks, to cut or trim them to desired sizes or shapes.

The invention relates to that type of device wherein the knives are arranged in rows that are actuated by hydraulic pressure. In some prior structures, the knives in each row were mounted in fixed relation to one another and shearing pressure was applied to all of them simultaneously, with the result that in the case of stones of uneven surface, the cutters at the high or thicker areas of a stone slab would exert their shearing function before those cutters that engaged with the thinner sections of the stone slab, and frequently there would be uneven lines of "break." This condition is aggravated when one face of the slab is slightly concave at one knife and the opposite face is slightly convex where an opposed knife engages.

Another objection to some of the previous structures which employed a hydraulic piston and cylinder for each knife is the fact that these various pistons and cylinders become subjected to grains of abrasive that result from the shearing operation.

My invention has for one of its objects the provision of mechanism wherein the knives are applied to the upper and lower faces of the stone in an approximately uniform manner regardless of irregularities of stone surface, preliminary to the application of operating pressure thereto, the knives in each row automatically conforming to the surface contours of the stone.

Another object of my invention is to provide a simplified form of apparatus wherein after the knives are positioned, a single pair of pistons and cylinders will serve to effect a shearing operation by an entire lower row and an entire upper row of knives, with uniform pressures, thereby eliminating the necessity for a large number of pistons and cylinders and also avoiding the necessity of using adjusting wedges and springs such as heretofore been sometimes employed in machines of this character.

Still another object of my invention is to provide a structure wherein the individual cutters or knives can readily be replaced and wherein the machine can readily be adapted to cutting along either straight or curved lines.

As shown in the accompanying drawings, Figure 1 is a side elevational view of the machine;

Fig. 2 is a fragmentary view taken on the line II—II of Fig. 1;

Fig. 3 is an enlarged side view of a portion of the structure of Fig. 2;

Fig. 4 is a schematic or diagrammatic view showing the fluid-pressure apparatus employed in the operation of the machine of Fig. 1;

Fig. 5 shows a modification of the knife-supporting racks arranged to cut along curved lines;

Fig. 6 shows a knife of preferred form, for trimming the edges of slabs to curved contours;

Fig. 7 is a perspective view of a knife that can be lightly welded to a shank or head therefor, so that its position can be changed to present either of three cutting edges of the work;

Fig. 8 is an enlarged sectional plan view showing a manner in which the hydraulic back-up tubes can be connected to a source of hydraulic supply;

Fig. 9 shows a modification of the knife-carrying plate of Fig. 5, and Fig. 10 shows still another form.

Figure 1:
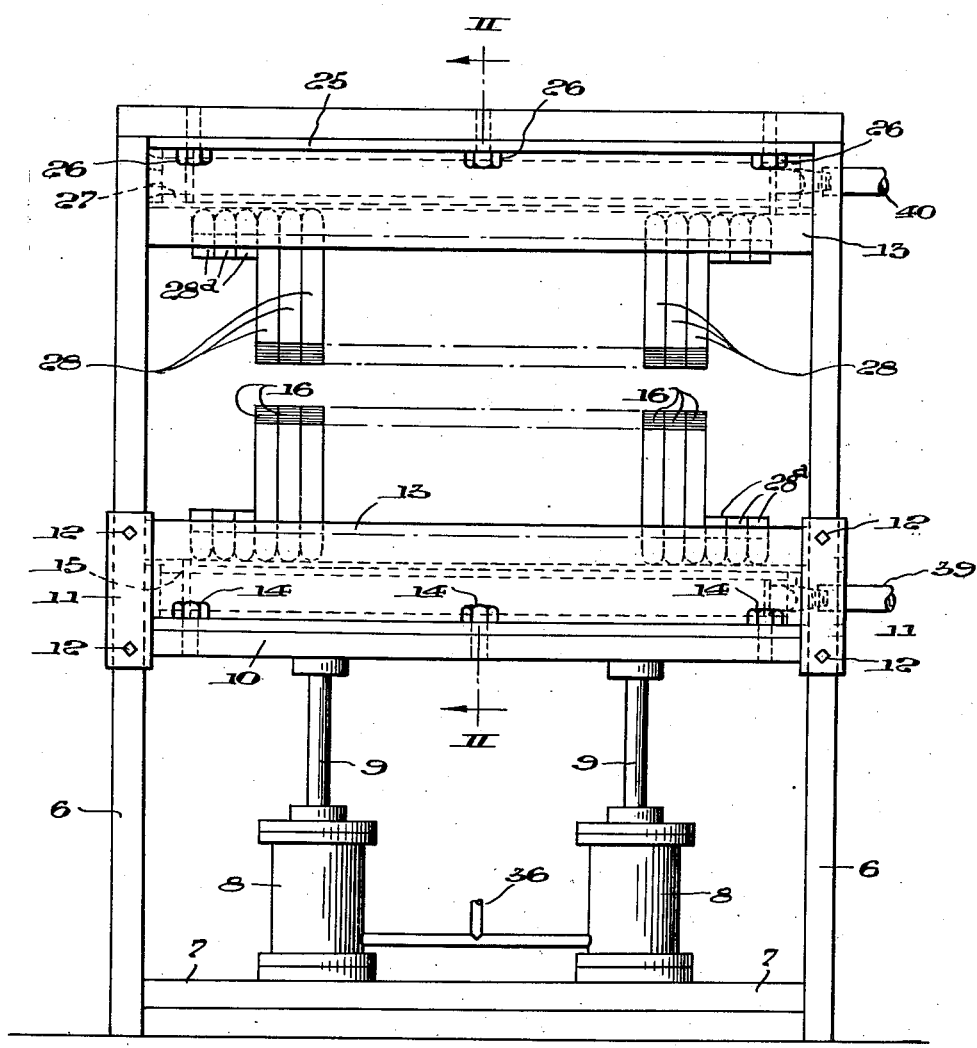

The framework 6 of the machine may suitably be mounted on a truck, along with a motor and pump, for transporting it from place to place. A bed plate 7 is mounted in the lower portion of the framework and supports a pair of cylinders 8 whose piston rods 9 are operated to move a cross head 10 upwardly in guideways 11 that are vertically adjustable on the uprights of the framework by set screws or bolts 12. The cross head 10 and the parts carried thereby will move downwardly along with the piston rods 9 when pressure is relieved from the lower ends of the cylinders 8 as will be hereinafter explained.

The cross head carries a bracket 13 of channel-like form that is welded to a plate 13a which is connected to the cross head by screws 14. Gussets 13b formed integrally with the plate 13a serve to brace the channel sides. A tube 15 suitably of about 3" diameter is contained within the channel 13 and is preferably of reinforced flexible rubber of sufficient strength to withstand the high pressures required for shearing stones, when liquid is trapped or confined within the tube as hereinafter explained.

A series of wedge-shaped knives 16 are slidably supported in the bracket 13, in closely-fitting side-by-side relation, the knives being provided with head or base portions 17 that have slight movement vertically within the bracket. Retaining members 18 held by screws 19 releasably hold the knives and spacers 28a in place. There may be a block 18 and screw 19 for each member 17, or a single member 18 of sufficient length to hold all of the knives may be used at each side. A liner strip 20 is interposed between the tube 15 and the heads 17, to prevent the tube from being deflected too sharply between adjacent members 17 when the tube 15 is subjected to extremely high pressures during a shearing operation through upward movement of the cross head 10. Filler strips 21 support the tube against deformation under internal pressure.

Too sharp deflections would result in damage to the tube and might affect uniformity of operation as between the various knives in the row. The strip 20 will preferably have insubstantial compressibility, although it will be flexible, and it will suitably be of a durometer gauge hardness of perhaps 40° to 90°, depending upon its thickness. In the present case, it is about ¼" thick, and may be as much as 1" thick.

The lower ends of the members 17 are curved as shown in Fig. 3, to facilitate uniformity of pressures against the knives, particularly when they are at uneven heights, against an irregular surface on the underface of a stone slab. If these lower ends were flat instead of curved, those bases which were lowermost would receive a great deal more pressure in advance of any pressures that were applied to some that were a little higher, besides which the squared corners would injure the rubber liner.

Filler rods 22 of rubber or other flexible material may be employed where highly flexible, thin filler strips 20 are used. At its upper end, the framework 6 carries a channel-shaped rack 25 of the same form as that shown at 13, the rack being secured to the upper framework by screws 26. In this case, the tubular member 27 corresponds to the member 15 and the knives 28 are held in the same manner as are the knives 16. The upper row of knives 28 need not be reciprocated vertically as are the cutters 16, since when the knives 16 are moved up against a slaw 29 that is brought into position along rollers 30, the knives 28 will be engaged by the stone slab during upward thrust by the knives 16 and will yield upwardly somewhat through flexure of the tube 27, within which liquid is trapped or confined, as in the case of the tube 15.

The piping system for operating the lower bank of knives through admission of fluid pressure to the lower ends of cylinders 8 is shown diagrammatically in Fig. 4 and comprises a motor 32 which operates a compressor 33 to direct oil or other liquid through a pipe 34 and past a valve 35 and thence through a line 36 to the cylinders 8. The liquid pressure is also conducted to a valve 37 and through a pipe 38 and pipes 39 and 40 to the tubes 15 and 27.

In order that the knives can readily adjust themselves to uneven surfaces on slabs, the tubes 15 and 27 are not completely filled with the liquid, the liquid level therein being such that there is an air space of approximately ¼" in the uppermost part of each tube. This permits of slight flexibility of the tubes and some relative movement as between the knives that is necessary to allow them to conform to uneven surfaces. However, when the knives are subjected to shearing pressures, the tubes will have the slight flexibility in diameter required to provide the desired substantially rigid resistance offered by the entrapped liquid, to shearing pressures.

The valve 37 will usually be maintained in closed position, but will be opened either to admit some more liquid through the pipes 38, 39 and 40, into the tubes 15 and 27, or turned to allow exhaust of some liquid therefrom, through a pipe 42 to a reservoir 43 from whence it will be drawn by the pump 33, as occasion may arise.

After upward shearing movement of the knives 16 is completed, the valve 33 will be turned to a position at which liquid will be exhausted from the cylinders at 8, through the drain pipe 42 to the reservoir, the cross head 10 and the knives 16 moving down under the action of gravity.

Provision is made for blowing away the dust and grit resulting from a shearing operation, by supplying air pressure from a suitable source through a line 44, a valve 45 and branch lines 46 and 47 to the two pipes 48 and 49, respectively, that are perforated to provide jets of air therefrom, thereby not only removing the dust and grit from the operating station, but preventing the grit from entering between the cutters and interfering with their vertical movements.

In Fig. 5, I show a bracket 51 of arcuate form wherein the knives are arranged semi-circularly. The bracket that carries the knives has secured thereto arms 52 and 53 which, in the case of the lower knives, will be secured to the cross head 10 in lieu of the bracket 13, and in the case of the upper knives, will be secured to the upper frame member.

When trimming slabs or blocks to circular contour, it is desirable to use knives 55 with a single bevel as shown in Fig. 6, so that there will be less danger of cracking the body of the stone slab than if the knives were beveled from both faces as in Figs. 2 and 3.

Referring now to Fig. 7, I show a knife 16a of triangular form, all three longitudinal edges of which can serve as cutters. These knives will be lightly welded or brazed to the shanks of the bases 17. When one cutting edge has become dull, the knife will be broken from the base and turned 120° and again welded to the shank of the knife base.

Fig. 8 is a sectional plan view, on an enlarged scale, showing the manner in which the pipe 40 is connected to the upper tube 27, the pipe 39 being connected in a similar manner to the tube 15. A terminal block 55 is connected to the end of the channel 13, by cap screws 56 and partly encloses a coupling member 57 which has tight connection with the tube 27. A block 58 of semi-circular form is connected to the member 57 by a pair of cap screws 59 and assists in holding the coupling member 57 firmly in place. An L joint 60 is connected to the pipe 40 by a conventional union coupling at 61.

Fig. 9, which is more particularly a modification of the structure of Fig. 5, shows a plate 65 that carries a series of channel-shaped brackets 66, 67 and 68 that correspond to the brackets 13 and 25 of Fig. 2. Instead of having only single rows of upper and lower knives respectively, as in Fig. 2, three channels are provided, each of which may support a curved row of knives, depending upon the size and radius desired. The knives will, of course, be backed up by tubes as in Figs. 2 and 5. It will be understood that only one row of knives can be used at any given time, the other rows of knives being not then present on the plate 65.

It is not essential to the more important features of my invention that hydraulic lifts be employed for raising and lowering the cross head that carries the lower group of knives, since the advantages of the hydraulic resistance to shearing stresses and the automatic conforming of the knives to the work will be present even if some means other than the hydraulic lifts are provided.

Referring now to Fig. 10, I show an arrangement wherein a strip 70 of rubber is substituted for the tubes 15 and 27, the member 70 being contained within a channel 71 that corresponds to the channels 13 and a pair of which will be connected to the upper and lower cross heads respectively. This rubber will serve in lieu of the hydraulic tubes, when the stone slabs to be sheared are not exceedingly rough on their surfaces or where the slabs have deposits of relatively soft minerals at various areas in their surfaces. It will have a durometer gauge hardness of perhaps 40° to 65°, depending upon its thickness and degree of desired resiliency. At any rate, when pressure on one of the knives 16 is greater than on other knives in the row, such other knives being perhaps opposite to a soft spot in the stone slab or at a depression therein, the compression of the rubber 70 by one of the knife bases 17 will distort the rubber and tend to expand the same at other locations, so that greater pressure will be supplied to knives that otherwise would not have effective shearing engagement with the slab.

It will be seen that both the hydraulic tubes and the strips 70 serve as single-piece equalizers, thus providing for a simplified arrangement that eliminates the wedges and springs and multiple piston and cylinder arrangements found on a number of prior art stone cutters.

I claim as my invention:

1. A stone-cutting machine comprising two oppositely disposed rows of knives that are of generally chisel form, the knives of each row normally having their edges in approximately longitudinal alinement, supporting brackets for the said rows, means for moving the brackets relatively to each other in a direction to thereby engage the respective rows of knives against opposite faces of a slab, a flexible tube held in the bracket and engaged by the outer ends of the knives in each row, and means for retaining fluid pressure in the tubes, at a degree that will prevent collapse of the tubes under shearing stresses.

2. A machine as recited in claim 1, wherein a hydraulic pressure device is employed for imparting the said relative movement, and a hydraulic pressure device simultaneously places the said tubes under internal pressure.

3. A machine as recited in claim 1, wherein one bracket is fixedly supported above the other bracket, and the said other bracket is moved upwardly by hydraulically-operated piston and cylinder apparatus.

4. A stone-cutting machine comprising two oppositely disposed rows of knives that are of generally chisel form, the knives of each row normally having their edges in approximately longitudinal alinement, supporting brackets of channel form slidably supporting the knives in each row, the open sides of the channels facing each other and the knives protruding therefrom, a flexible tube in each bracket positioned behind the inner ends of the knives, and serving to limit movement of the knives into the channels, means for moving the channels relatively to each other and engaging the respective rows of knives against the opposite faces of a slab, and means for confining a liquid within each tube.

5. A machine as recited in claim 4, wherein removable stop means are provided for releasably supporting the knives against movement completely out of the channels.

6. A cutter head comprising a bar-like bracket that supports a row of knives of generally chisel form that extend transversely thereof and whose edges protrude outwardly at one side of the bar, the shanks of the knives being slidably supported by the bar, for movement transversely thereof, a flexible tube extending parallel to the bar and in abutting engagement at one side with the inner ends of the knife shanks, a seat on the bar for the other side of the tube, and means for maintaining a condition of fluid pressure within the tube, sufficient to withstand shearing forces to which the knives may be subjected.

7. A cutter head as in claim 6, wherein the inner ends of the shanks are of convex contour at those areas that engage the tube, about axes parallel to the knife edges.

8. A cutter head as recited in claim 6, wherein a flexible liner of dense, flexible rubber is interposed between the tube and the inner ends of the shanks.

9. A cutter head as recited in claim 6, wherein the cutter head is of arcuate form about a transverse axis, with the knife edges normally in approximately a common plane, and beveled on only one side.

References Cited in the file of this patent

UNITED STATES PATENTS

| | | |
|---|---|---|
| 1,229,622 | Lake | June 12, 1917 |
| 2,152,193 | Johanning | Mar. 28, 1939 |
| 2,188,318 | Siderits | Jan. 30, 1940 |
| 2,616,411 | Lake | Nov. 4, 1952 |
| 2,723,657 | Jones | Nov. 15, 1955 |